Nov. 24, 1931.  E. C. WILLY  1,833,010
MACHINE FOR FORMING ELECTRICAL COILS, ETC
Filed Nov. 21, 1930  2 Sheets-Sheet 2
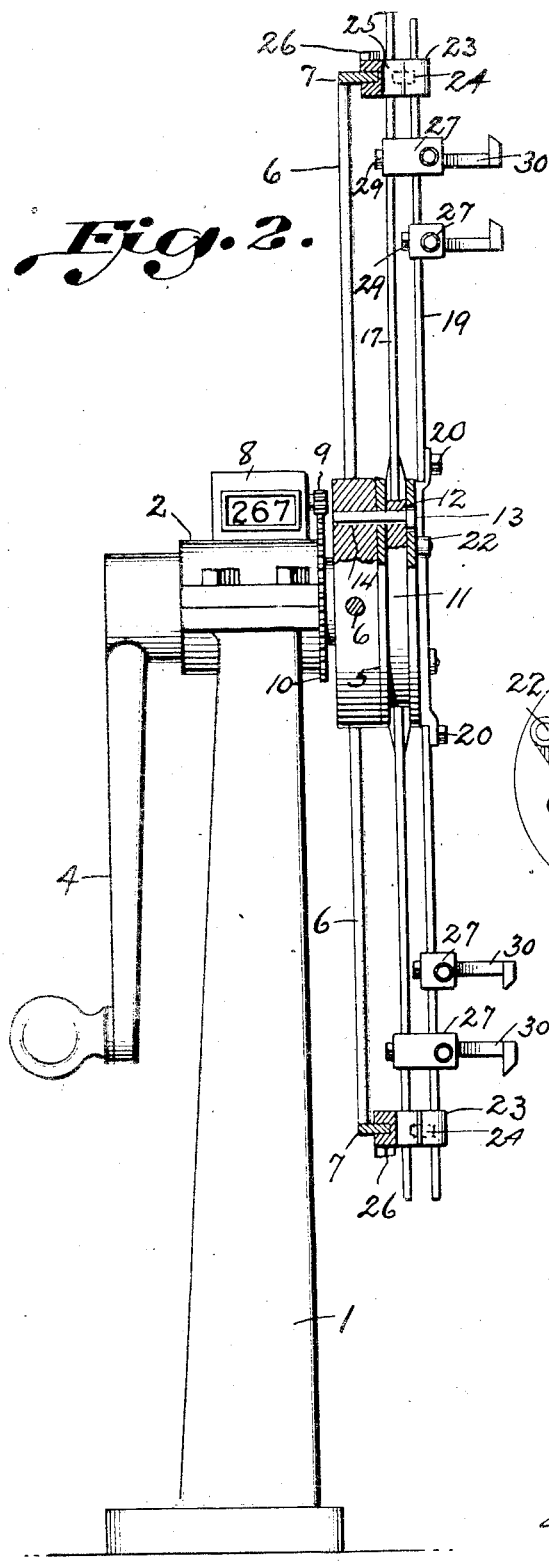
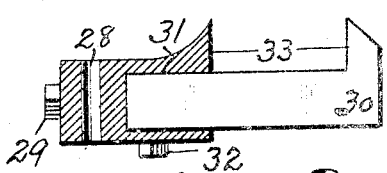
Fig. 2.
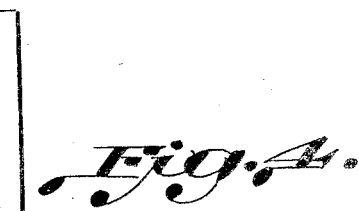
Fig. 3.
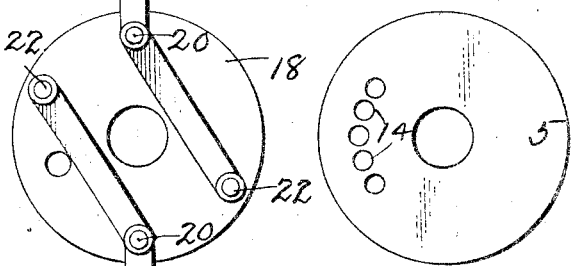
Fig. 4.
Fig. 5.
Inventor,
Edwin Clarence Willy
By
Atty.

Patented Nov. 24, 1931

1,833,010

UNITED STATES PATENT OFFICE

EDWIN CLARENCE WILLY, OF EVANSVILLE, INDIANA, ASSIGNOR OF ONE-HALF TO EDWARD HENRY POGGEMEIER, OF VANDERBURG COUNTY, INDIANA

MACHINE FOR FORMING ELECTRICAL COILS, ETC.

Application filed November 21, 1930. Serial No. 497,310.

The winding of coils for electric motors by hand is a tedious operation and, as commonly practiced, involves the winding of the wire on a wooden form so that the coil will be of the precise size and shape to adapt it for its purpose. Forms of this character are usually of wood and ofttimes have to be specially made for one job and then thrown away, as they are of no further use.

The object of my invention is to provide an improved machine for winding motor coils, wherein provision will be made for adjustment to enable coils of different sizes and shapes to be wound on the same machine, merely by adjusting the machine according to the size and shape that it is desired to produce.

Preferably, an indicator or counter is used to automatically show the number of windings in the coil, thus enabling the operator to wind a coil of any desired number of turns.

The invention comprises an improved rotary reel which may be turned by motor or hand crank, having fingers which are adjustably mounted so that they may assume different positions, together with improved means for locking the fingers where adjusted, improved adjustable hooks for the fingers, and other improved features and novel combinations hereinafter described and which are shown in the accompanying drawings, wherein:

Fig. 2, is a side elevation with certain parts broken away;

Fig. 3, is a detail view of one of the hooks, certain parts being broken away;

Fig. 4, is a detail view of the disc, and a pair of fingers and links therefor, shown detached from the machine; and Fig. 5, is a detail view of the rotatable hub by itself, showing the plurality of holes therein.

Figure 1:
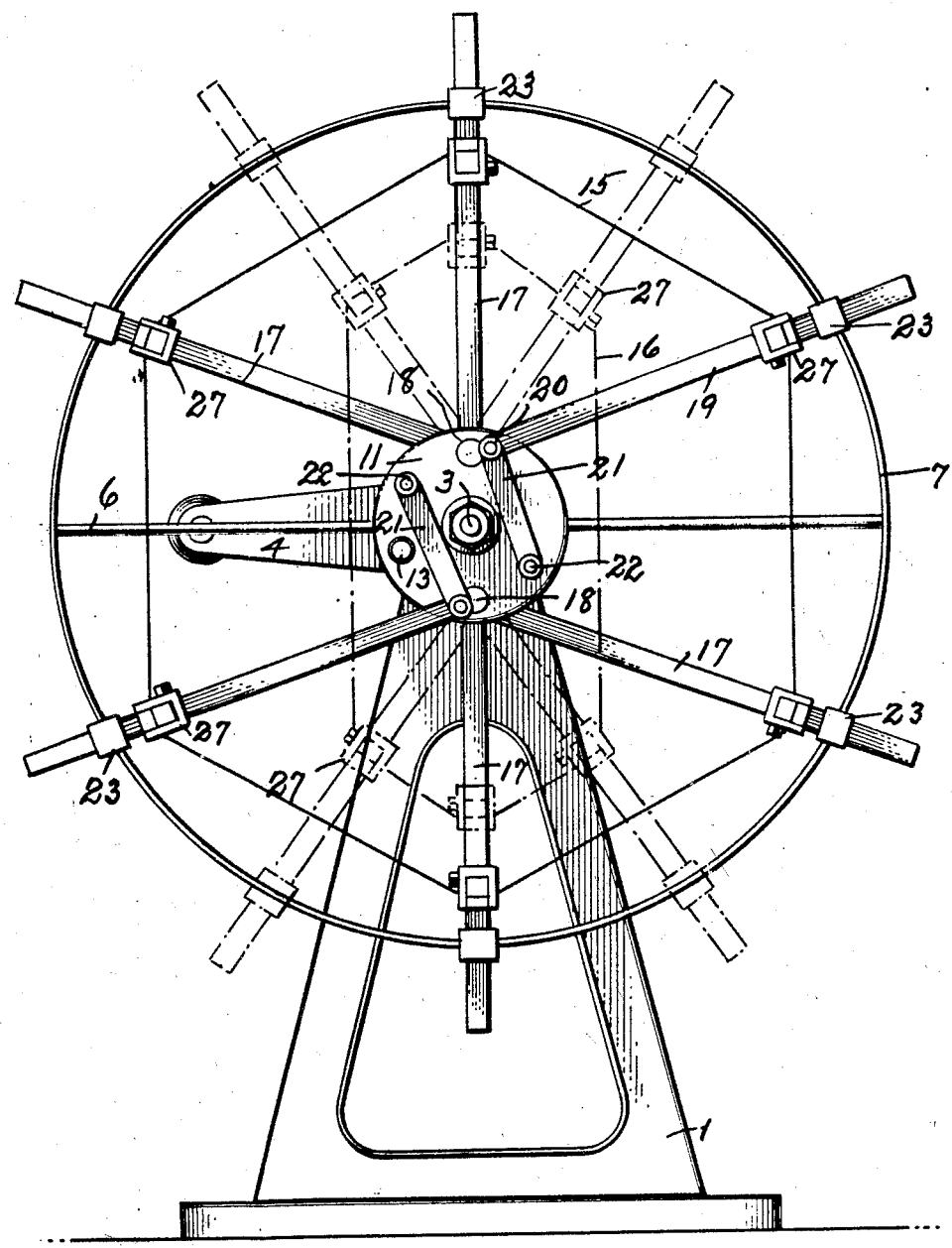
Figure 1, is a front elevation, dot and dash lines representing one of the adjusted positions of the fingers and the outline of a different size and shape of coil which may be produced by such adjustment.

The operative parts of the machine are carried by a frame 1 whose base may be fastened to a table or bench. Journaled in a bearing 2 on the frame 1 is a shaft 3, which projects beyond one face of the bearing to carry the operative parts hereinafter described. A crank 4 is carried by the other end of the shaft. In lieu of the crank 4, any gearing or belt and pulley drive gear may be used, driven by an electric motor.

Secured to the shaft 3 so as to turn therewith is a hub 5 which carries rods 6 constituting spokes for a reel whose band 7 is suitably connected to the spokes 6.

The reel comprising the spokes 6 and the band 7, constitutes the carrier for the coil winding structure. To afford means showing the number of revolutions of the shaft 3, there may be provided an indicator 8 having a pinion 9 which meshes with a gear 10 carried by the hub 5. This indicator 8 shows to the operator the number of coils or turns which have been wound. The indicator may be of any standard or preferred type, having re-setting means so that it may be started at zero when a winding job is commenced.

Loosely mounted on the shaft 3 is a spool-shaped disc 11 which is provided with an opening 12 through which a removable pin 13 may be passed and entered into any one of a plurality of holes 14 in the hub 5, as shown in Fig. 2, thereby to couple the disc 11 to the hub 5. As many of the holes 14 may be provided as necessary, to afford adjustments which are hereinafter described.

There are two sets of fingers, all of which are used in winding the coil 15, which appears in full lines in Fig. 1 and also in dot and dash lines at 16 in said figure. One set of these fingers comprises the individually adjustable fingers 17 which are pivoted at their inner ends within the groove of the disc 11 by the pivots 18, Fig. 1.

The other set of fingers 19, instead of being directly pivoted to the disc 11, are pivotally connected at 20 to a link 21 in each instance. The link 21, in each instance, is pivotally connected at 22 to the disc 11. The pivotal connections 20 are of the type which can be clamped as, for instance, a bolt and nut or bolt and wing nut, as in Fig. 2, so that the fingers 19 will be rigid with the links 21 when the pivotal joint 20 is tightened, or, on loosening the joint 20, a collapsing action will occur, under the tension of the wound coil 15 to enable the coil to be removed, as hereinafter described.

Each of the fingers 17, 19, is provided with a sleeve 23 which is swivelled at 24 to an adjustable connector 25 having a slot which receives the edge of the band or rim 7 and is adapted to be secured thereto by a set screw 26 in any position to which the finger may be adjusted.

All of the fingers carry adjustable hooks of the construction appearing in Fig. 3. These hooks comprise a connector 27 having a hole 28 through which passes the finger 17 or 19, as the case may be enabling the hook to be adjusted radially along the finger to any desired point, and there is a set screw 29 by which the connector may be secured where adjusted. The hook 30 itself has its shank received in a socket 31 in the connector 27 and secured therein by a set screw 32. It will be observed that the hook and the face of the connector each has a flat surface 33 which surfaces collectively constitute walls, determining the width of the coil 15. By adjusting the hook inwardly or outwardly, this width may be varied.

Assuming that the parts are set, as shown in full lines in Fig. 1, the connections being clamped right, the coil represented at 15 may be wound in the hexagonal shape shown. If a coil of different shape is desired, the connectors 27 and their hooks are slid along the fingers and the fingers themselves adjusted and re-clamped to the band 7 so that a coil such as shown at 16 in dot and dash outline, may be wound. Thus, any desired size and shape of coil may be wound by turning the crank 4.

If it is desired to remove the coil which has been wound, the connectors 20 are loosened and the pin 13 is pulled out of the hole 14, whereupon, if the reel is turned about one fourth of a revolution, the fingers 19 will draw in toward the shaft 3, allowing the hooks on the fingers to travel closer to the center of rotation, thus releasing the coil.

What I claim is:

1. In a machine for winding coils for electric motors, the combination with a rotary wheel, of fingers carried thereby having means adjustable along said fingers, adapted for supporting the coil which is to be wound, said fingers being adjustably connected to the band or rim of the wheel and pivotally connected to the central part of the wheel.

2. In a machine for winding coils for electric motors, the combination with a rotary wheel, of fingers carried thereby having means adjustable along said fingers, adapted for supporting the coil which is to be wound, certain ones of said fingers having a pivotal connection to the central part of the wheel and other ones of said fingers having an articulated connection to the central part of the wheel, and all of the fingers having an adjustable connection to the rim or band of the wheel.

3. In a machine for winding coils for electric motors, the combination with a wheel having a rim and a hub, of a disc, means for coupling the disc to the hub and by which said disc may be uncoupled from the hub so that it will turn independently of said hub, fingers pivoted to the hub and having adjustable connections with the rim, other fingers connected to the hub by links and provided with means by which the links may be rigid with said fingers or loosely connected to said fingers, means adjustably connecting the said other fingers to the rim, and coil supports carried by all of the fingers, said supports being adjustable along the said fingers.

4. In a machine for winding coils for electric motors, the combination with a wheel, of a plurality of fingers, means adjustably mounted on said fingers and adapted for supporting the coil which is to be wound, connections between all of the fingers and the wheel, certain ones of said fingers being directly pivotally connected to the central part of the wheel, and certain other ones of said fingers having links pivotally connecting them to the central part of the wheel, and joints connecting said other fingers to said links, which joints are adapted to be tightened or loosened so that the said other fingers may be pivotally connected to the links or made rigid with said links.

In testimony whereof I affix my signature.

EDWIN CLARENCE WILLY.